United States Patent
Chung et al.

(10) Patent No.: US 10,476,888 B2
(45) Date of Patent: Nov. 12, 2019

(54) SYSTEMS AND METHODS FOR USING VIDEO FOR USER AND MESSAGE AUTHENTICATION

(71) Applicant: Georgia Tech Research Corporation, Atlanta, GA (US)

(72) Inventors: Simon Pak Ho Chung, Atlanta, GA (US); Wenke Lee, Atlanta, GA (US); Yeong Jin Jang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 78 days.

(21) Appl. No.: 15/467,023

(22) Filed: Mar. 23, 2017

(65) Prior Publication Data

US 2017/0279815 A1   Sep. 28, 2017

Related U.S. Application Data

(60) Provisional application No. 62/311,942, filed on Mar. 23, 2016.

(51) Int. Cl.
| | |
|---|---|
| *H04L 29/06* | (2006.01) |
| *H04L 9/32* | (2006.01) |
| *H04L 9/08* | (2006.01) |

(52) U.S. Cl.
CPC .......... *H04L 63/123* (2013.01); *H04L 9/0825* (2013.01); *H04L 9/0891* (2013.01); *H04L 9/321* (2013.01); *H04L 9/3226* (2013.01); *H04L 9/3242* (2013.01); *H04L 63/0861* (2013.01)

(58) Field of Classification Search
CPC ..... H04L 63/123; H04L 9/3226; H04L 9/321; H04L 9/0891; H04L 9/0825; H04L 9/3242; H04L 63/0861; H04L 9/32; G01L 17/22; G01L 17/24; G06F 17/10; G06F 17/3074

See application file for complete search history.

(56) References Cited

U.S. PATENT DOCUMENTS

| | | | | |
|---|---|---|---|---|
| 5,392,355 A | * | 2/1995 | Khurana | H04W 12/02 340/5.74 |
| 6,338,140 B1 | * | 1/2002 | Owens | H04W 12/06 380/255 |
| 7,890,051 B2 | * | 2/2011 | Best | H04B 7/18565 455/12.1 |
| 10,068,072 B1 | * | 9/2018 | Jeffree | G06F 21/30 |
| 2008/0098464 A1 | * | 4/2008 | Mizrah | G06F 21/36 726/5 |

(Continued)

FOREIGN PATENT DOCUMENTS

| | | | | |
|---|---|---|---|---|
| JP | 10032859 | * | 7/1996 | H04B 7/62 |

OTHER PUBLICATIONS

Watanabe et al.; "Blockchain Contract:A Complete Consensus using Blockchain", 2015, IEEE, pp. 577-578. (Year: 2015).*

(Continued)

*Primary Examiner* — Matthew Smithers
(74) *Attorney, Agent, or Firm* — Troutman Sanders LLP; Ryan A. Schneider; Brennan M. Carmody

(57) ABSTRACT

Aspects of the disclosed technology include a method including identifying, by a computer device, a message; encoding, by the computer device, the message; receiving, by the computer device, a video of a user reciting the encoded message; and providing, by the computer device, the message and the video for verification an authenticity of the message.

20 Claims, 12 Drawing Sheets

(56) References Cited

U.S. PATENT DOCUMENTS

| | | | |
|---|---|---|---|
| 2011/0002453 A1* | 1/2011 | Finkle | H04M 3/4228 |
| | | | 379/133 |
| 2014/0033284 A1* | 1/2014 | Harik | H04L 63/08 |
| | | | 726/5 |
| 2015/0128240 A1* | 5/2015 | Richards | H04L 63/0861 |
| | | | 726/7 |
| 2018/0129795 A1* | 5/2018 | Katz-Oz | G06F 21/32 |
| 2018/0232591 A1* | 8/2018 | Hicks | G06K 9/00906 |

OTHER PUBLICATIONS

Morishita, English Abstract of JP 10032859, 1996, Derwent, pp. 1 (Year: 1996).*

* cited by examiner

SYSTEMS AND METHODS FOR USING VIDEO FOR USER AND MESSAGE AUTHENTICATION

CROSS-REFERENCE TO RELATED APPLICATIONS

This application claims the benefit of U.S. Provisional Application No. 62/311,942, filed Mar. 23, 2016, which is hereby incorporated herein by reference in its entirety.

TECHNICAL FIELD

The present disclosure is related to authentication, and more particularly, to providing systems and methods for authenticating a user using video.

BACKGROUND

Public key cryptography provides strong (mutual) authentication, digital signatures (with non-repudiation), and encryption. The use of public key systems may prevent certain security problems related to authentication, access control, and data security. However, for many users, the adoption of public keys is not intuitive. For example, it may not be readily obvious to some users how to create and use a public key, or how verify another user's identity with their public key. In addition, without widespread adoption of a related art system, it may not be easy for users to share public keys.

In some instances, the related art suggests generating public/private key pairs and announcing the public key on a user's social network accounts. These related art methods link the announced public key to the user's social network account, implicitly relying on a verified link between the user and his/her social network account. However, a person may not be reliably associated with a social network account. For example, these related art systems may be compromised by creating a counterfeit social network account, or by gaining control of a legitimate social network account.

Other related art approaches suggest the use of biometrics (e.g., a fingerprint or a self-image) to authenticate a user. However, if a biometric of the related art system compromised, the biometric may not be reused. In other words, a user only has one set of fingerprints and one physical appearance. Therefore, if a malicious actor gets a copy of the user's fingerprints or the user's self-image, the malicious actor may access any system secured using the biometric.

In addition, related art techniques often require account recovery based on user knowledge (e.g., password, birthday, social security number, or mother's maiden name), static biometrics (e.g., fingerprint or iris pattern), or security apparatuses (e.g., phone or security token). However, information, including static biometrics, may be compromised, and security apparatuses may be lost, stolen, or destroyed, creating additional burdens for account recovery and authentication.

SUMMARY

Briefly described, and according to one embodiment, aspects of the present disclosure generally relate to a method of authenticating a user. According to some embodiments, there is provided a method including: identifying, by a computer device, a message; encoding, by the computer device, the message; receiving, by the computer device, a video of a user reciting the encoded message; and providing, by the computer device, the message and the video for verification an authenticity of the message.

The encoding may include: converting the message to a plurality of numerical values; extracting, from at least one collection of speakable words, a plurality of speakable words corresponding to the plurality of numerical values; and encoding the message as a multi-word phrase of the plurality of the extracted speakable words.

The capturing the video may include capturing the video of the user reciting both the encoded message and personally identifying information of the user.

The capturing the video may include capturing the video of the user reciting both the encoded message and a current time.

The message may include a public encryption key.

The method may further include: hashing, by the computer device, the public encryption key and the video; uploading, by the computer device, the hash of the public encryption key and the video to a server; and confirming, by the computer device, that the hash of the public encryption key and the video have been recorded on the server. The providing the message and video may include uploading, in response to confirming that the hash of the public encryption key and the video have been recorded on the server, the video and the public key to the server.

The message may include a new public encryption key, the providing may include uploading the video and the new public encryption key to a public-ledger, and the method may further include revoking a previous public encryption key associated with the user.

The revoking may include implicitly revoking the previous public encryption key by uploading the video and the new public encryption key.

The method may further include: hashing, by the computer device, the new public encryption key and the video; uploading, by the computer device, the hash of the new public encryption key and the video to the public-ledger; and confirming, by the computer device, that the hash of the new public encryption key and the video have been recorded on the server. The providing may include uploading, in response to confirming that the hash of the new public encryption key and the video have been recorded on the public-ledger, uploading the video and the new public encryption key to the public-ledger.

The providing may include uploading the video and message to a server, and the server may operate as an append-only public ledger.

The server may further operate as a first-only public ledger.

According to some embodiments, there is provided a method including: accessing, by a computer device, a public ledger to identify a first message and a second message, the first message including a first hash value, and the second message including a video and a public encryption key; hashing, by the computer device, the video and the public encryption key from the second message to create a second hash value; comparing, by the computer device, the first hash value and the second hash value; encoding, by the computer device, the public encryption key to a speakable phrase; determining that the video includes a speaker reciting the speakable phrase; and verifying, by the computer device and in response to the comparing indicating that the first hash value equals the second hash value and the determining that the video includes the speaker reciting the speakable phrase, the public encryption key.

The method may further include: identifying, by the computer device, a time associated with the first message; and determining, by the computer device, that the first message is an earliest message in the public server for the identified time associated with the first message.

The verifying the public key may be further in response to the determining that the first message is the earliest message.

The first message may further include personally identifying information, the method may further include determining that the personally identifying information corresponds to the speaker in the video, and the verifying the public key may be further in response to the determining that the personally identifying information corresponds to the speaker in the video.

The public ledger may be a first-only public ledger.

According to some embodiments, there is provided a method including: initiating, by a computer device, a telephone communication to an external device; encoding, by the computer device, a shared secret shared with the external device; converting the encoded shared secret to a series of dial-tones; and transmitting, to the external device and using the telephone communication, the series of dial tones.

The encoding may include encoding the shared secret using a public encryption key.

The public encryption key may be verifiable by a video of a user of the computer device posted to an append-only public ledger.

The method may further include: sharing, by the computer device, the public encryption key with the external device; and sharing, by the computer device, the shared secret with the external device.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
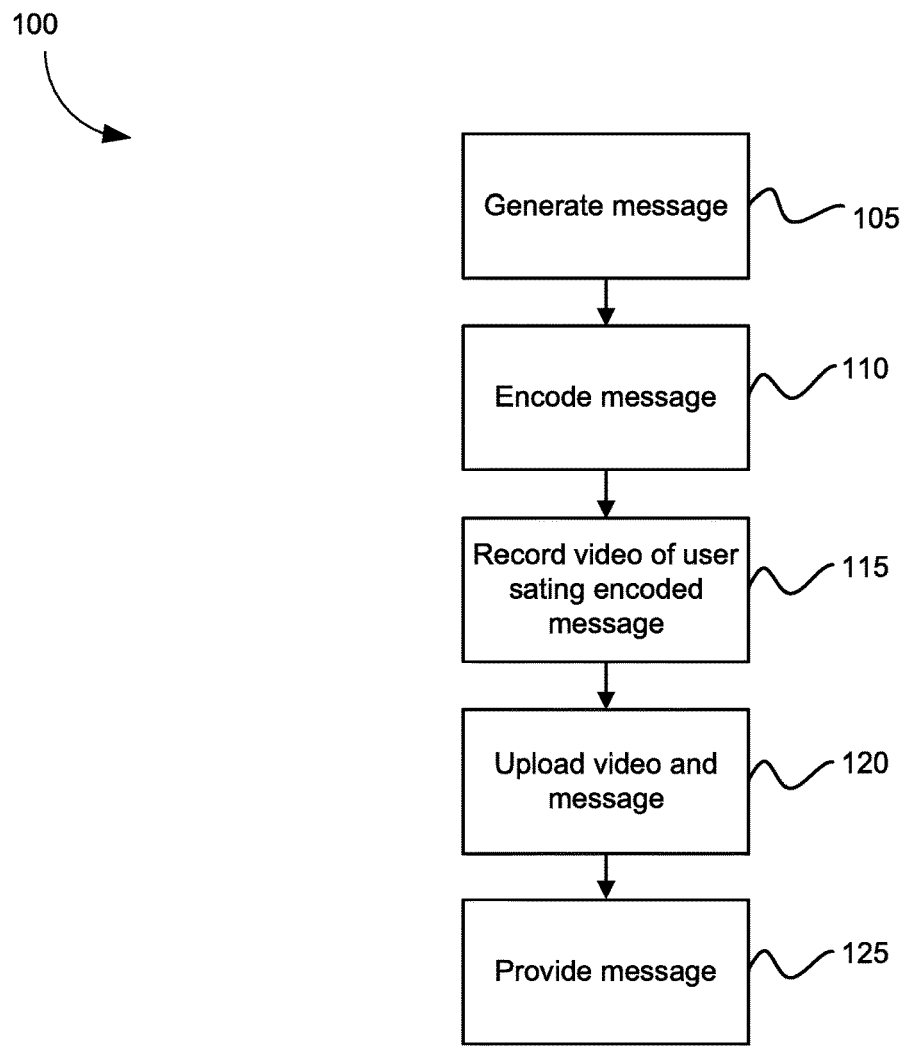
FIG. 1 is a flowchart of publishing a message according to an example embodiment.

The following detailed description relates to systems and methods for authentication that is secure and more easily verifiable. In addition, there is a need for improved account and key recovery and revocation.

Public/private encryption key pairs may be used to securely transfer data to an intended recipient. For example, when a sender wants to securely transfer data to a recipient, the sender's computing device can encrypt a message that includes the data using a public key. Only a holder of the corresponding private key can decrypt the message and thus gain access to the transferred data.

Similarly, public/private encryption pairs can be used to verify the identity of a sender. Thus, in example scenarios, the sender's computing device encrypts a message using a private key. The sender may send the message to a particular recipient, or publish the encrypted message for any interested recipient. A recipient device can then use the corresponding public key to decrypt the received message, but the recipient device's ability to decrypt the message using the public key is contingent on the message being properly encrypted with the private key, which ensures the identity of the sender.

In some cases, two public/private key pairs may be used to provide secure, verified communication between two parties. For example, a bank may know a first private key and a bank customer (i.e., the user) may know a second private key. The bank may encrypt the customer's account information with the first private key (known only by the bank) and a second public key corresponding to the second private key (known only by the user). Encrypting with the first private key verifies that the account information is from the bank, and encrypting with the second public key ensures that only the user can access the account information. Upon receipt of the message encrypted with the first private key and second public key, in addition to the account information, the user may decrypt the account information using the second private key, which corresponds to the second public key, and a first public key corresponding to the first private key.

While public and private key encryption can verify a sender's identity or provide secure transmission of data, this is only true if the recipient of the public key can verify the identity of the owner of the public/private key pair. That is, it may be difficult to determine whether the owner of a public/private key pair is who they say they are, because, for example, malicious actors could pretend to be someone else or alter a public key as it is being sent from the true owner.

In an example embodiment, where a user wants to provide a way for a third party to verify that a public key belongs to the user, the user's device may map the public key (of a public/private key pair) to a speakable phrase, and the device then outputs the speakable phrase to the user. Subsequently, the user can record a video of him or herself reciting the speakable phrase. The user may then transmit the video in addition to the public key to the bank. If the bank knows how the user's device maps public keys to speakable phrases, the bank may map the public key it believes is received from a particular user to a speakable phrase in a same manner as the user's device, and analyze the video to ensure that 1) the video includes the particular user, and 2) the particular user recites the speakable phrase in the video. The bank may by confident that messages which can be decrypted using the public key are from the user, and messages encrypted with the public key can only be decrypted by the user.

According to some implementations of the disclosed technology, a third-party may authenticate a message from a user through the use of video. In a video of the user, the user may state an encoded version of a message (e.g., an encoded version of a public key), and the video may be uploaded to a server by the user's device. The message may then be sent to the third party (e.g., by the user's device). If the third-party knows how the message was encoded, the third-party may encode the received message in a same manner and compare the encoded received message to the encoded version of the message recited in the video. If the encoded received message matched the encoded version recited in the video, the third-party may verify the message. For example, a user may record a video of him or herself stating the encoded version of the message, and upload the video to the server. The user's device may transmit the message directly to the third party, and the third party may refer to the video stored on the server to verify the message's authenticity.

In some cases, the message may be a public key of a public/private encryption key pair, and the public key may be encoded into a speakable phrase. In some cases, the video may further include the user stating personal information and a current date or time. A third party may verify that the public key belongs to the user by referring to the video of the encoded public key (e.g., by watching the video or through audio and video analytics).

According to some embodiments, a public key may be verified by analyzing a person's voice and facial features from a video to confirm that an expected user has provided the public key. Accordingly, in some cases, preexisting, potentially unverified accounts are not relied on and compromised accounts may not be an issue.

In some embodiments, the video includes the user stating an uncommon series of words as the encoded message. Therefore, it is unlikely that video of a user stating the encoded message could be illicitly acquired. In addition, in some cases, a user further states a current date or time, thus linking the video, and verification of the public key, to a particular instance in time.

According to some embodiments, a user's key or accounts may be recovered through the use of changing biometrics (i.e., a video message from the user). Thus, in some cases, the user can reassert his identity or account privileges by announcing a new public key. In some cases, disputes on the validity of the user's public key can always be resolved by viewing and/or analyzing the video stored on the server (e.g., an append-only public ledger).

Figure 11:
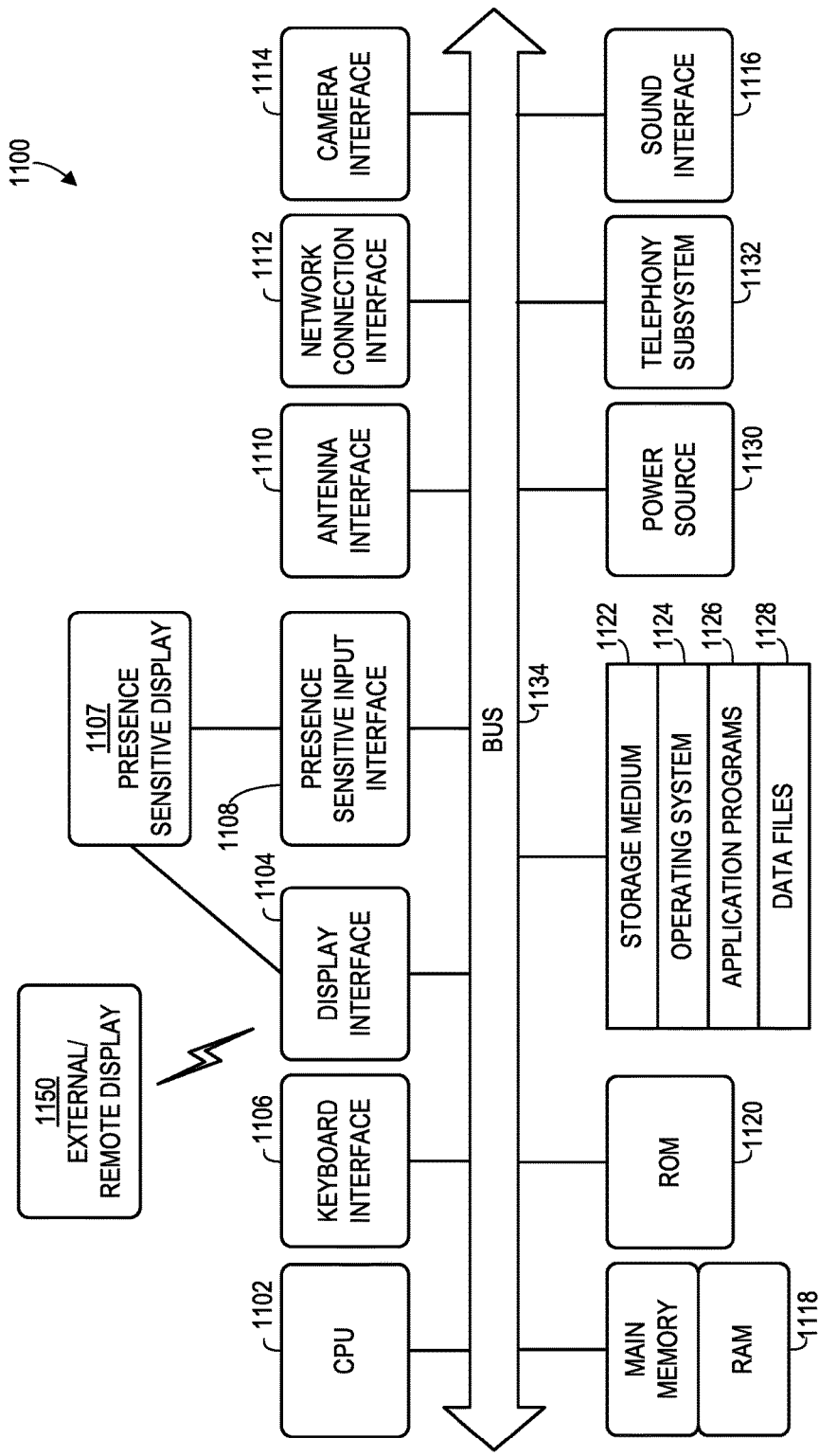
FIG. 11 is an example computer architecture for implementing example embodiments.
Figure 12:
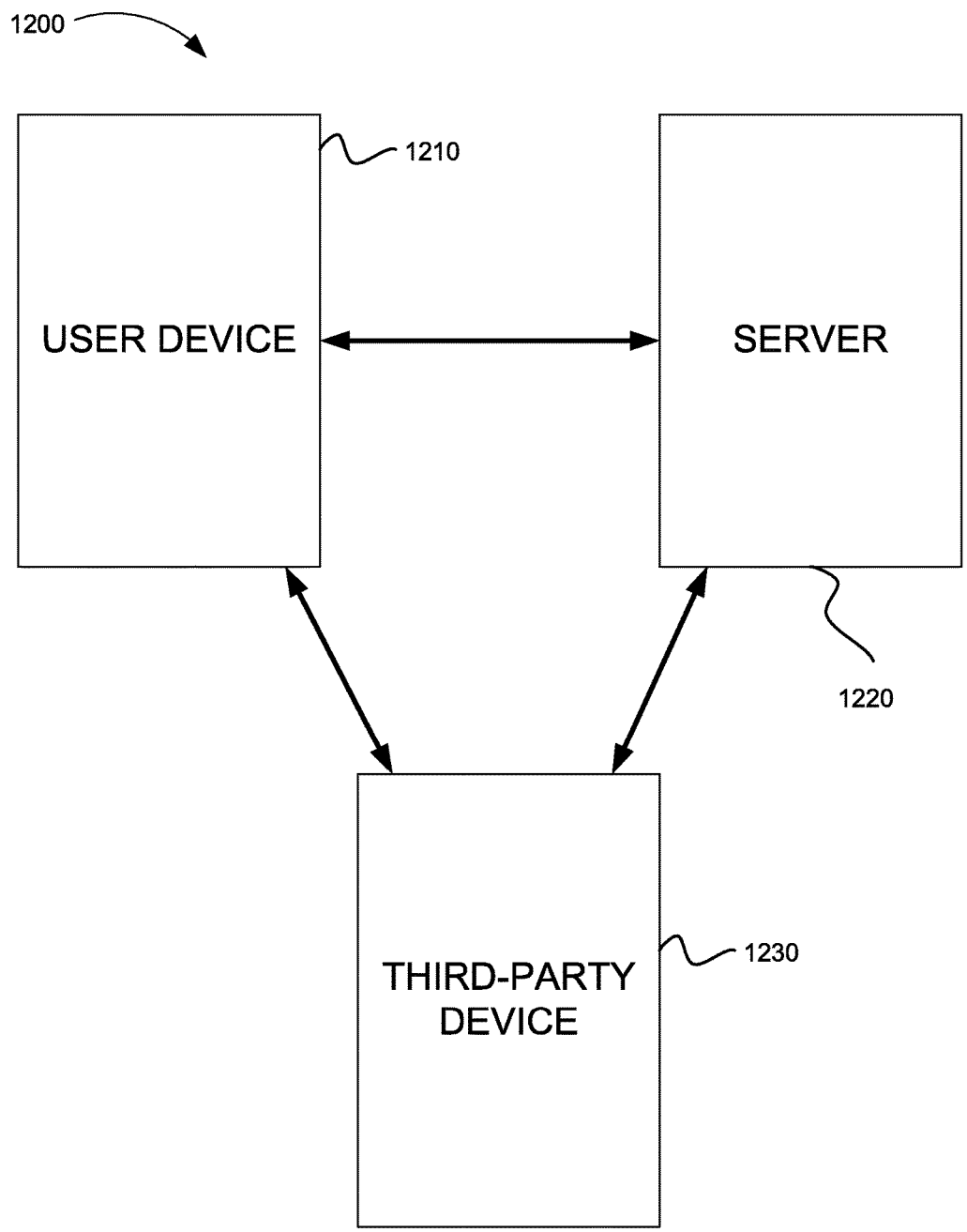
FIG. 12 is an example environment for implementing one or more example embodiments.

Referring now to the figures, FIG. 12 illustrates an example environment 1200 for implementing one or more example embodiments. The environment 1200 includes a user device 1210, a server 1220, and a third-party device 1230. In some cases, the user device 1210 may provide a video of a user stating an encoded message to the server 1220. The server 1220 may store the video. The user device 1210 may provide the message to the third-party device 1230. The third-party device 1230 may refer to the video stored on the server 1220 to verify the authenticity of the user device 1210 or the message. As non-limiting examples, the user device 1210, the server 1220, and the third party-device 1230 may each be one or more of a smart phone, a mobile phone, a laptop, a personal digital assistant (PDA), a tablet, and a smart TV. An example computer architecture of one or more of the user device 1210, the server 1220, and the third-party device 1230 will be described below in greater detail with reference to FIG. 11.

FIG. 1 is a flowchart of a method 100 for publishing a public key according to an example embodiment. As a non-limiting example, the method 100 may be performed by a system (e.g., a user device 1210). In some embodiments, a user may use the user device 1210 to generate 105 a message (e.g., a public key), encode 110 the message, record 115 a video of the user saying the encoded message, upload 120 the original message and the video to the server 1220, and provide 125 the message to a third party (e.g., a third-party device 1230). In some cases, the user device 1210 provides 125 the message to the third party together with a link to the uploaded video and message on the server 1220. The third party may then authenticate the message by referring to the uploaded video and message stored on the server 1220. For example, the third-party may know how the user device encodes 110 the message, and the third-party device may encode the message stored on the server 1220 in a same manner, and compare the encoded message to the encoded message recited by the user in the video stored on the server 1220. In some cases, the third-party may also verify that the person reciting the encoded message in the video is the person from whom the message is allegedly from. As a non-limiting example, the message may be a public key of a public/private encryption key pair, and the encoded message may be a speakable phrase derived from the public.

The method 100 may include generating 105 a message. The message may include, as a non-limiting example, a public key. In some cases, the public key may be generated 105 randomly. As a non-limiting example, the public key may be part of a public/private key pair, for example, an RSA public/private key pair, as will be known to one of ordinary skill.

Next, the message is encoded 110. An example of encoding 110 the message is described below with reference to FIG. 2. A video of the user saying the encoded message is recorded 115. The original message and the video of the user saying the encoded message are uploaded 120 (e.g., to a server). The user may provide 125 the message (e.g., post the message to a social networking site or e-mails the message), which can be authenticated by a third-party device 1230 by referring to the uploaded video and message.

Figure 2:
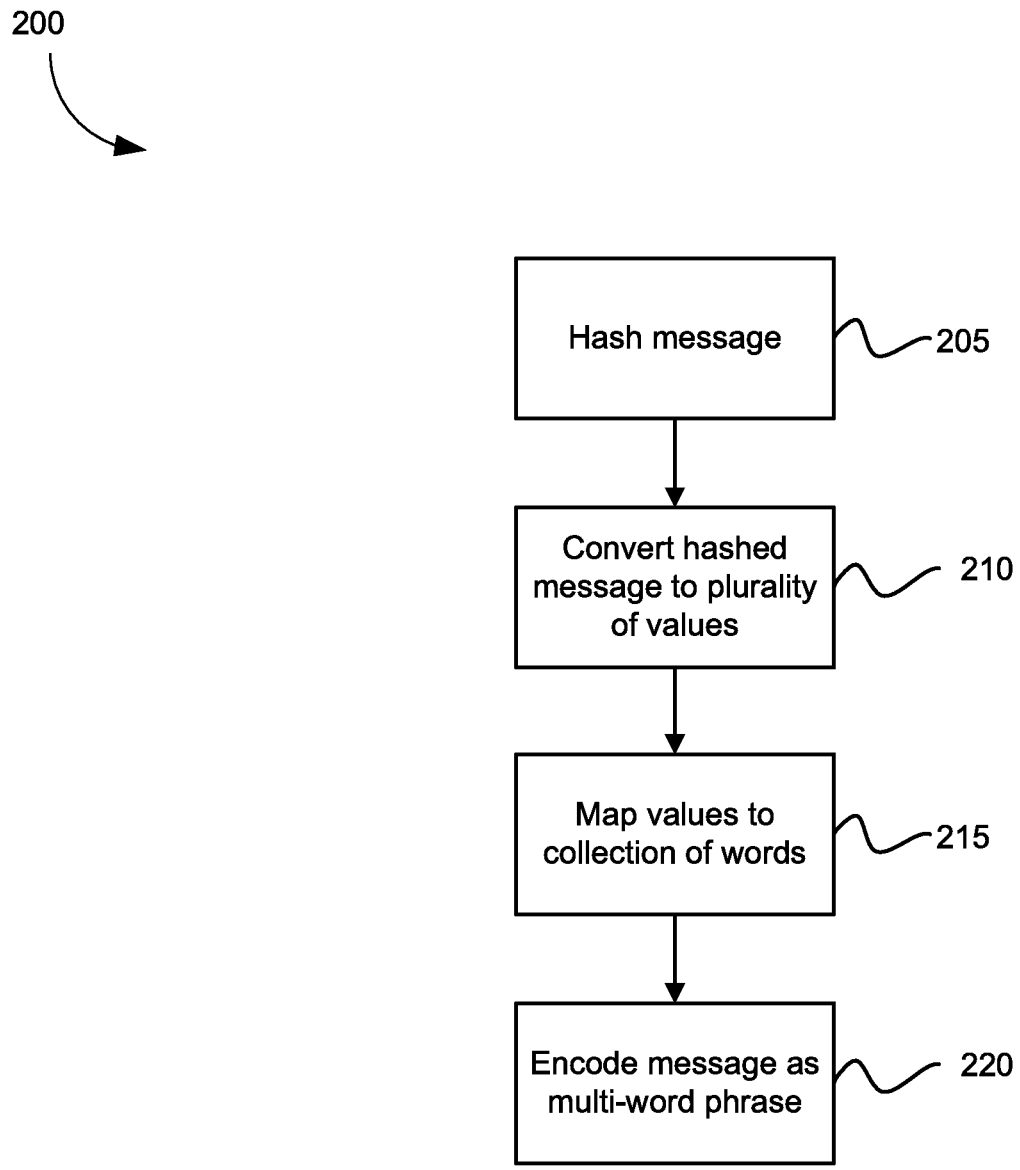
FIG. 2 is a flowchart of encoding a message according to an example embodiment.

FIG. 2 is a flowchart of a method 200 for encoding a message (e.g., a public key) according to an example embodiment. In some embodiments, the method 200 may be performed by a system (e.g., a user device 1210). For example, the user device 1210 may hash 205 the message, convert 210 the hashed message to numerical values, map 215 the numerical values to multiple words, and encode 220 the message as a multi-word phrase.

Referring to FIG. 2, the message is hashed 205. For example, a secure hash algorithm (SHA) may hash 205 the message. The hashed message is converted 210 into a plurality of values. The values are mapped 215 to a plurality of words (e.g., from a list of predefined words). The message is then encoded 220 as a multi-word phrase.

As a non-limiting example, the message may be a public encryption key k. The user device 1210 hashes 205 the public encryption key k to an SHA256 hash h. The user device 1210 converts hash h into a hexadecimal representation hex. For example, hex=A1B5234AD5 . . . . Pairs of the hexadecimal digits may be encoded 220 into a speakable phrase, using the actual value of the hexadecimal digits to determine which word from word arrays to use. As a non-limiting example, Table 1, below, includes three arrays:

TABLE 1

| Array | Word List |
|---|---|
| A | {one, two, three, four, five, six, seven, eight} |
| B | {big, huge, small, tiny} |
| C | {apple, orange, banana, tomato, dog, cat, bear, tiger} |

For example, the first two hexadecimal digits of hex, 'A1,' is binary 10100001. So the value to index to Array A would be 5 (101), to Array B would be 0 (00), and to Array C would be 1 (001). The user device 1210 maps 215 these values to "six," "big," and "oranges," respectively, and encodes 220 the message as the speakable phrase "six big oranges." One of ordinary skill will understand that this is merely an example, and various alternatives and modifications to encoding the message are considered within the scope of the present disclosure.

Figure 3:
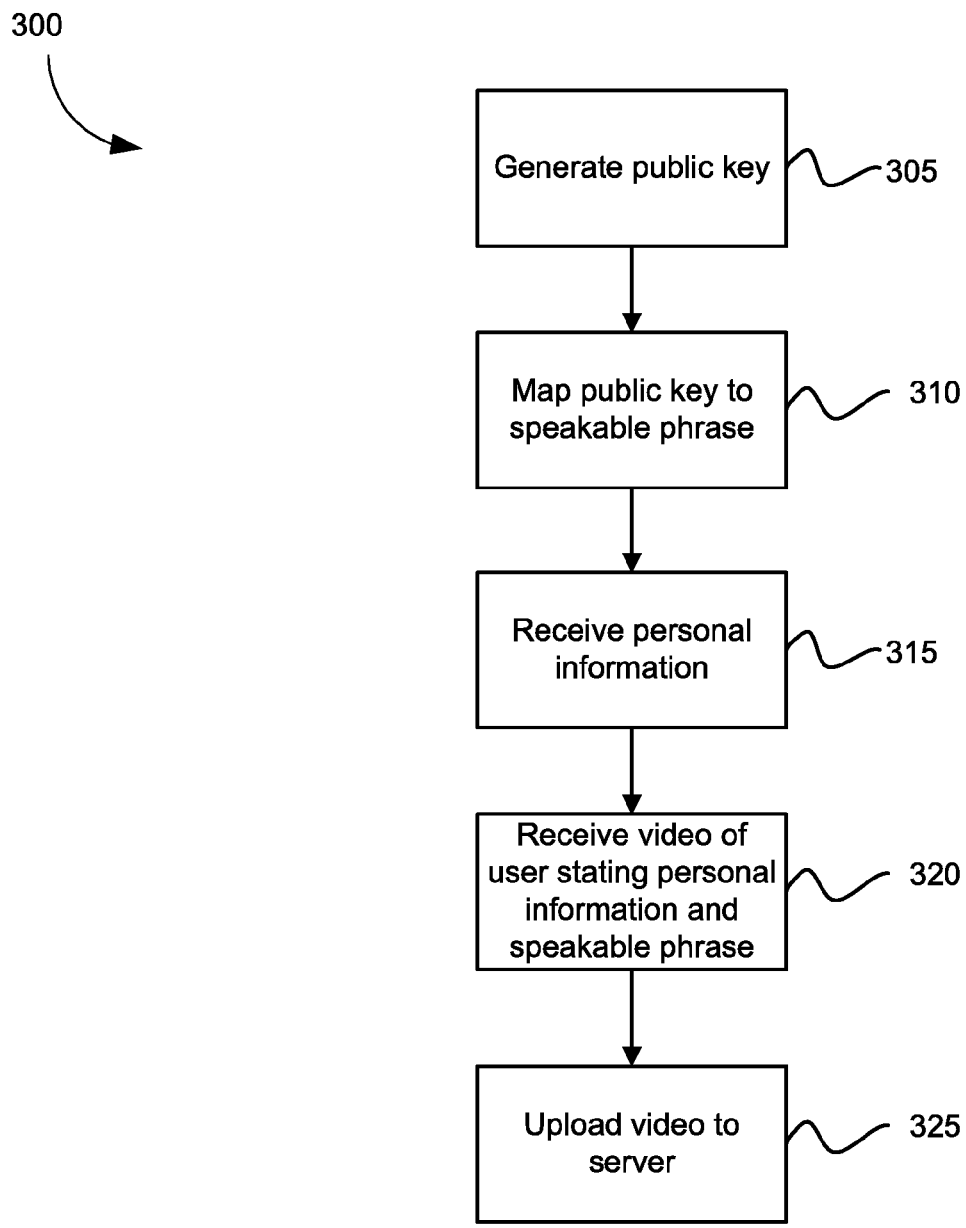
FIG. 3 is a flowchart of a publishing a public key according to an example embodiment.

FIG. 3 is a flowchart of a method 300 for publishing a public key according to an example embodiment. As a non-limiting example, the method 300 may be performed by a user device 1210. Referring to FIG. 3, the method 300 can include generating 305 a public key. In some cases, the public key may be generated as part of a public/private key pair. In some cases, the public key may be previously generated (e.g., previously generated by a user or provided by a security service), and the method may include identifying the public key. As shown in FIG. 3, the method 300 can include mapping 310 the public key to a speakable phrase, for example, in a similar way as that described with reference to FIG. 2. In some embodiments, an application (e.g., an application installed on a smart phone) may generate 305 the public key and map 310 the public key to the speakable phrase.

The method 300 can further include receiving 315 personal information (e.g., name, affiliation, position) of a user, e.g., input by a user to the user device 1210, and receiving 320 a video of the user stating the personal information and the speakable phrase. In some embodiments, the receiving 320 includes capturing the video by the user device 1210. In some cases, the receiving 315 the personal information and receiving 320 the video may be done contemporaneously. In some circumstances, the video further includes the user stating a time, such as the current date. The user device 1210 may use the stated time to detect a misuse of the video to announce a different key at a same time (e.g., if a malicious actor copies the video and provides a different public key that encodes to the same phrase). Therefore, in some cases, the user device 1210 may not accept a new public key stating a same or earlier time or date.

Finally, as shown in FIG. 3, the method can include uploading 325 the video and the speakable phrase to a server 1220. The user may then share or verify his/her personal information or public key on-line using the records on the server 1220. For example, the user may provide the public key to a third party (e.g., a third-party device 1230), and the third party may confirm that the public key belongs to the user by referring to (e.g., viewing or analyzing) the video uploaded to the server 1220. As another example, the user may provide an encrypted message to a third party that can be decrypted using the public key. The third party may decrypt the message using the public key, and verify that the public key belongs to the user by referring to (e.g., viewing or analyzing) the video uploaded to the server 1220.

In some embodiments, the server 1220 may operate as an append-only public ledger. As would be understood by one of ordinary skill, an append-only public ledger publishes all uploaded information for public inspection. An append-only public ledger does not provide a way to remove or replace a key. Accordingly, in some cases, attempts to produce counterfeit keys will be visible to the public, and may be discovered through analysis (e.g., through watching the video, or through performing audio or visual analysis on) of the video (e.g., identified as incorrect by actual associates of the user).

Since the user only states a speakable phrase corresponding to his/her public key in the video, a malicious actor could misuse the broadcasted video to announce a different key that corresponds to the same speakable phrase (e.g., two public keys that, when hashed 205, would be converted 210 to the same plurality of values). In order to avoid this problem, in some embodiments, the server 1220 will only accept a video of a first person to announce the same personal information (e.g., name, affiliation, position) for the time stated in the video (e.g., operate as a "first-only ledger").

Figure 4:
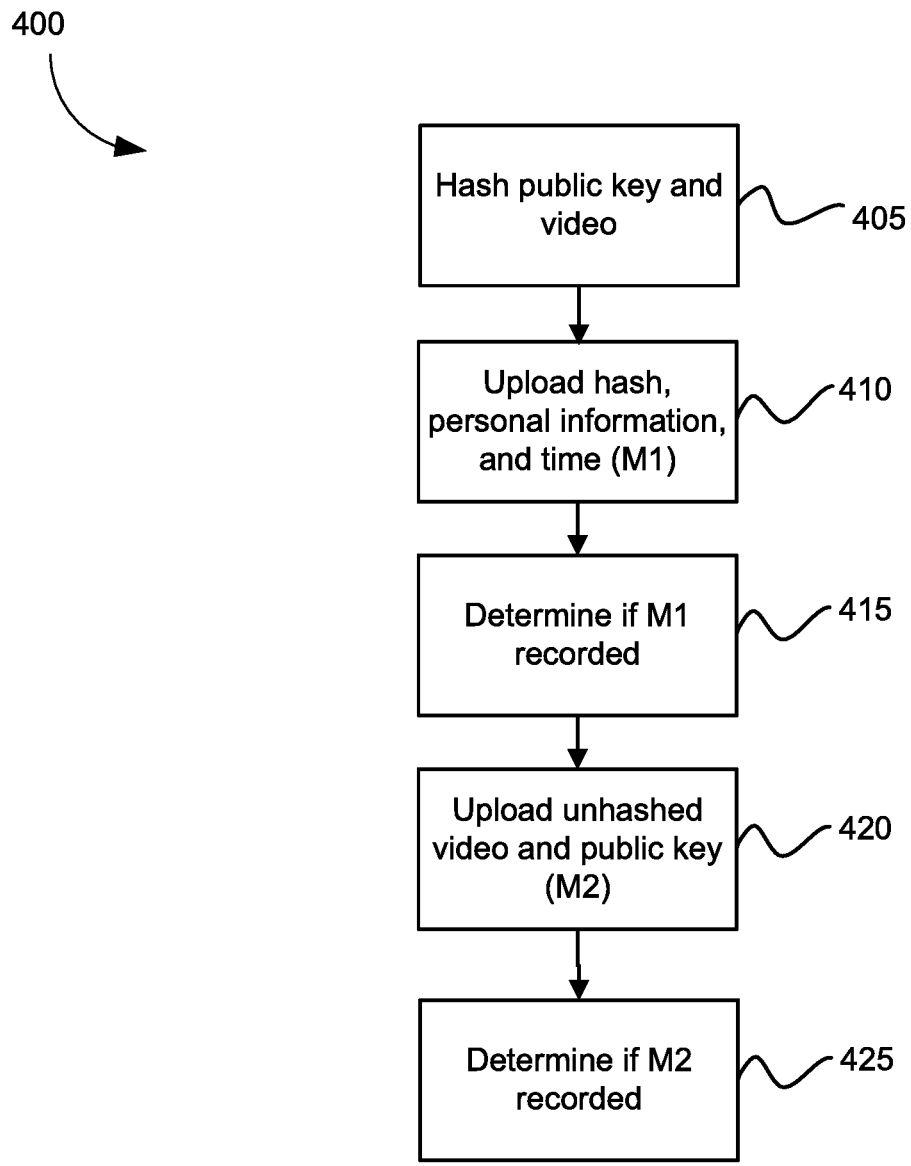
FIG. 4 is a flowchart of two-step announcement according to an example embodiment.

FIG. 4 is a flowchart of a method 400 of a two-step announcement process according to an example embodiment. As a non-limiting example, a user device 1210 may perform the two-step announcement process. In some cases, a user may use a two-step announcement process to, for example, provide additional security, and to defend against attacks from the hosting server. For example, multiple public keys (e.g., a legitimate public key and a counterfeit public key) may map to a same speakable phrase. The two-step announcement process helps prevent the server or other malicious actor from utilizing a video to announce a counterfeit key.

Referring to FIG. 4, the method 400 includes hashing 405 the public key and the video. For example, values of the video (e.g., digital values of a video file) may be hashed 405 with the public key by the user device 1210. The hashed video and public key, personal information of the user, and a time may be uploaded 410 to the server 1220 as a first message (M1), for example by the user device 1220. The user device 1220 may check the server records to determine 415 that M1 is accurately recorded by the server 1220. In some embodiments, the determining 415 includes ensuring that M1 is the first message for the time.

If M1 is accurately recorded, the unhashed video and public key are uploaded 420 to the server 1220 as a second message (M2), for example, by the user device 1210. The user device 1210 may check the server records to determine 425 if M2 is accurately recorded by the server 1220. For future verification, the unhashed video and public key from M2 may be hashed and compared to the hash value from M1. Accordingly, if the public key is not properly uploaded by the server 1220, the hash of M2 will not be the same as the hash in M1.

In some cases, the server 1220 may operate as a first-only-ledger, and enable use of a two-step announcement process. Therefore, in some cases, third-parties (e.g., third-party devices 1230) may confirm that an announced public key is legitimate (e.g., is not a counterfeit public key that has the same hash as the intended public key). The two-step announcement process helps to ensure that a counterfeit public key would be identified by creating a mismatch between M1 and M2.

Figure 5:
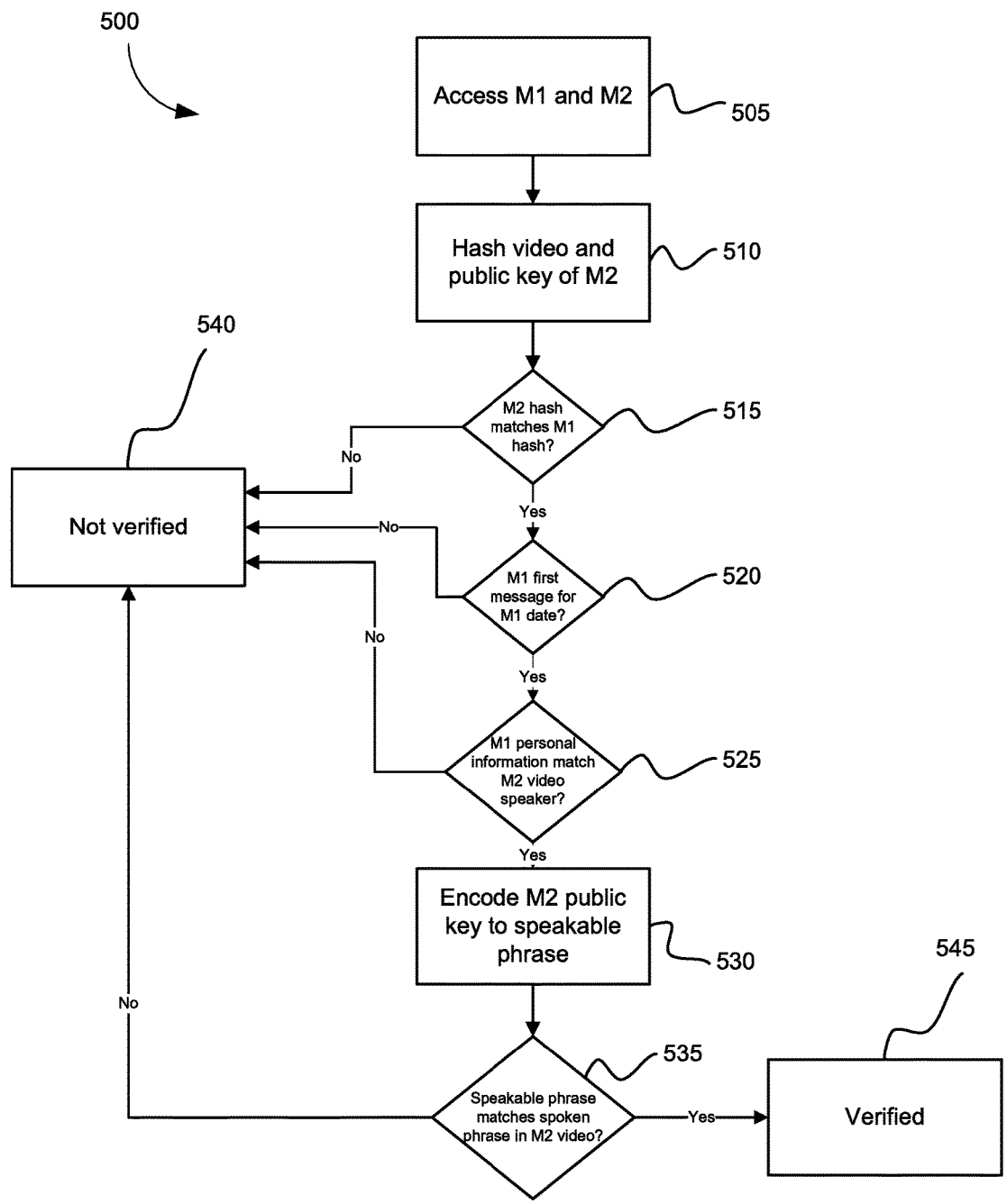
FIG. 5 is a flowchart of verifying a public key according to an example embodiment.

FIG. 5 is a flowchart of a method 500 for verifying a public key according to an example embodiment. In some cases, the method 500 may be performed by the third-party device 1230, such as a hosting server of a user account or a user device of another party. Referring to FIG. 5, the method 500 can include accessing 505 M1 and M2 stored on the server 1220. The third-party device 1230 may hash 510 the public key and video from M2 are hashed 510, and compare 515 the hashed value from M2 to the hash value in M1. The third-party device 1230 may inspect the server 1220 to determine 520 if M1 is the first message for the time reflected in M1.

In some cases, the speaker in the video may be confirmed 525 to be the person identified by the personal information.

For example, the video may be displayed on the third-party device 1230 to an interested third party along with the personal information for the third-party to confirm the identity of the speaker. In some cases, voice and/or facial recognition (e.g., executed on the third-party device 1230) may confirm 525 the identity of the speaker.

The method 500 may include encoding 530, by the third-party device 1230, the public key in M2 into a speakable phrase. The speakable phrase is then compared 535 to the phrase spoken by the speaker in the video of M2. In some cases, the speakable phrase may be displayed (e.g., on the third-party device 1230) along with the video for the interested third party to compare 535 the phrases. In some cases, text-to-speech may be used to determine the phrase spoken in the video and compared 535 to the speakable phrase generated by encoding 530 the public key by the third-party device 1230. The method 500 may include concluding that the public key is verified 540 or not verified 545.

Examples of Public Key Use

In some embodiments, the server records may be used for user login verification. For example, a user's password can be derived by using a private key to encrypt a website domain (e.g., "gmail.com"). Thus, in some cases, the password may be strong and unique. In addition, the website (e.g., third-party device 1230) can verify the user's identity by decrypting the password using the user's public key.

In some cases, the server record may be used by the user device 1210 and the website (e.g., the third-party device 123) each time a user logs into a hosted account. For example, a user (e.g., a user device 1210) can upload his or her public key as discussed above. Each time a user accesses his or her account, the user's device 1210 may generate a passcode by encrypting, for example, a current time-stamp and the website's URL. In some cases, the encrypting may be performed by the user device 1210. The account host (e.g., the third-party device 1230) can verify the user's identity by decrypting the passcode using the public key verified by video stored in the server 1220.

In some cases, public/private key pairs may be used to verify a user is a person, and not a computer program (e.g., a bot), for example, by a user device 1210 and a third-party device 1230. In some cases, the encryption using public keys may be performed by an application, for example, a smart phone application, executing on the user device 1210.

In some embodiments, the user's public key may be kept hidden from an account host (e.g., a hosting server or a web service), for example, to protect an identity of the user. In this case, the user can provide a message encrypted by the private key (e.g., a website URL) to the server 1220. By decrypting the message using the public key, the server 1220 may verify that the user is a person, and certify the same to a third-party device 1230.

Figure 6:
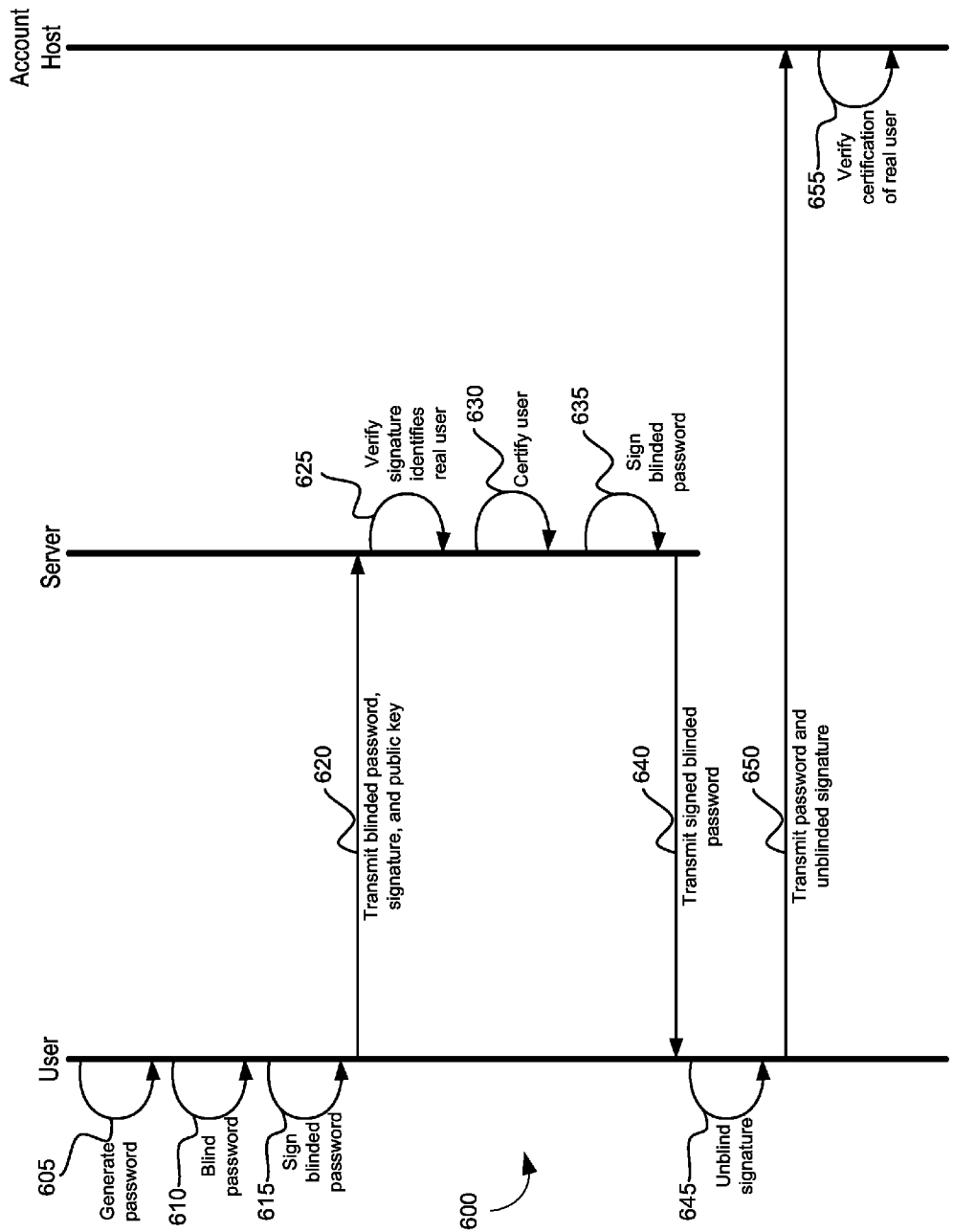
FIG. 6 is a timing diagram illustrating use of a blind signature scheme according to an example embodiment.

FIG. 6 is a timing diagram illustrating a process 600 for using of a blind signature scheme according to an example embodiment. The user (e.g., the user device 1210) generates 605 a password using the user's private key. The user blinds 610 the password, signs 615 the blinded password, and transmits 620 the blinded password, the signature of the blinded password, and the user's public key to the server 1220.

The server 1220 verifies 625 the signature for the blinded password, and certifies 630 that the user is a real user. The server 1220 signs 635 the blinded password using the server's private key, and transmits 640 the blinded password to the user. Upon receiving the signature of the blinded passcode from the server 1220, the user can unblind 645 the signature to obtain the server signature for the password, and send 650 both the password and the signature to the account host (e.g., the third-party device 1230). The account host can verify 655 the user is a real user based on the server's certifying signature.

In some cases, the signature may include a value corresponding to the user (e.g., provided by the server 1220). For example, the server 1220 may sign 640 the blinded password together with a random string that the server maintains and uses in all such transactions with the user (e.g., the user device 1210). This extra information from the server 1220 may be used by the account host to detect multiple registrations from the same user (or public key) by recognizing that the same extra information from previous registrations. Further, even if the extra information is known, an adversary would be unable to relate the password to the user's identity without also gaining access to the server.

According to some embodiments, blind signature schemes can be used so the server 1220 can still use the user's public key to make sure a proposed password is tied to that public key (and a real person), and sign the proposed password "blindly." In other words, while the server 1220 does not know what password it is signing, the user can unblind the signature and later show the server 1220 that it has signed his/her password. As such, the server 1220 can know that the password is tied to a real person, but cannot tie the password to a specific public key (and real person).

Figure 7:
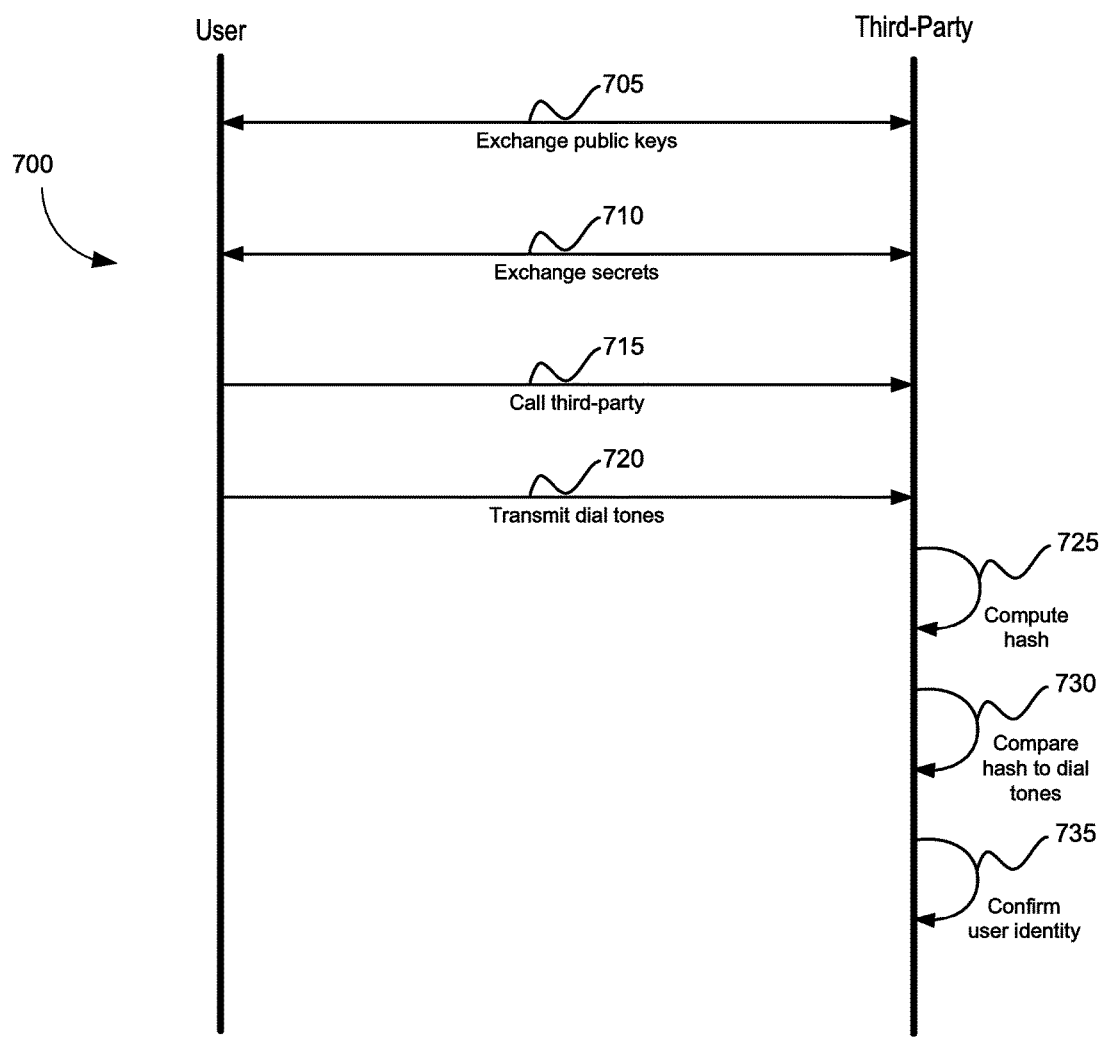
FIG. 7 is a timing diagram of authenticating over a phone according to an example embodiment.

In some embodiments, the public and private keys may be used to verify a user's identity over a phone call. FIG. 7 is a timing diagram of a process 700 of authenticating over a phone according to an example embodiment. A user (e.g., a user device 1210) and a third party (e.g., a third-party device 1230) exchange 705 public keys. The user and third party exchange 710 secrets, for example, using an authenticated Diffie-Hellman scheme or through encryption using the public and private key pairs. One of ordinary skill will understand that this is merely an example, and other mechanisms may be used to exchange secrets. One of ordinary skill will understand that, in some embodiments, the public keys and the shared secret may be exchanged beforehand.

The user's phone (e.g., the user device 1210) calls 715 the third party (e.g., the third-party device 1230), and generates 720 dial tones that indicate a current time and a hash of the current time and the shared secret. The third party computes a hash 725 using the current time and the shared secret, and compares 730 the computed hash to the hash indicated by the dial tones. If the hashes match, the user's identity is confirmed 735.

One of ordinary skill will understand that the use of a hash of the current time and a shared secret is merely a non-limiting example and other information may be conveyed by the dial tones to authenticate the user. In addition, one of ordinary skill will understand that a similar process may be conducted when the third party contacts the user over the phone.

Example Key and Account Revocation and Recovery

In some cases, public-private key pairs may be revoked or recovered. In some cases, with an authentication system built on top of the public key ledger (e.g., the server 1220) as described above according to some example embodiments, key revocation/recovery may be equivalent to account recovery.

Figure 8:
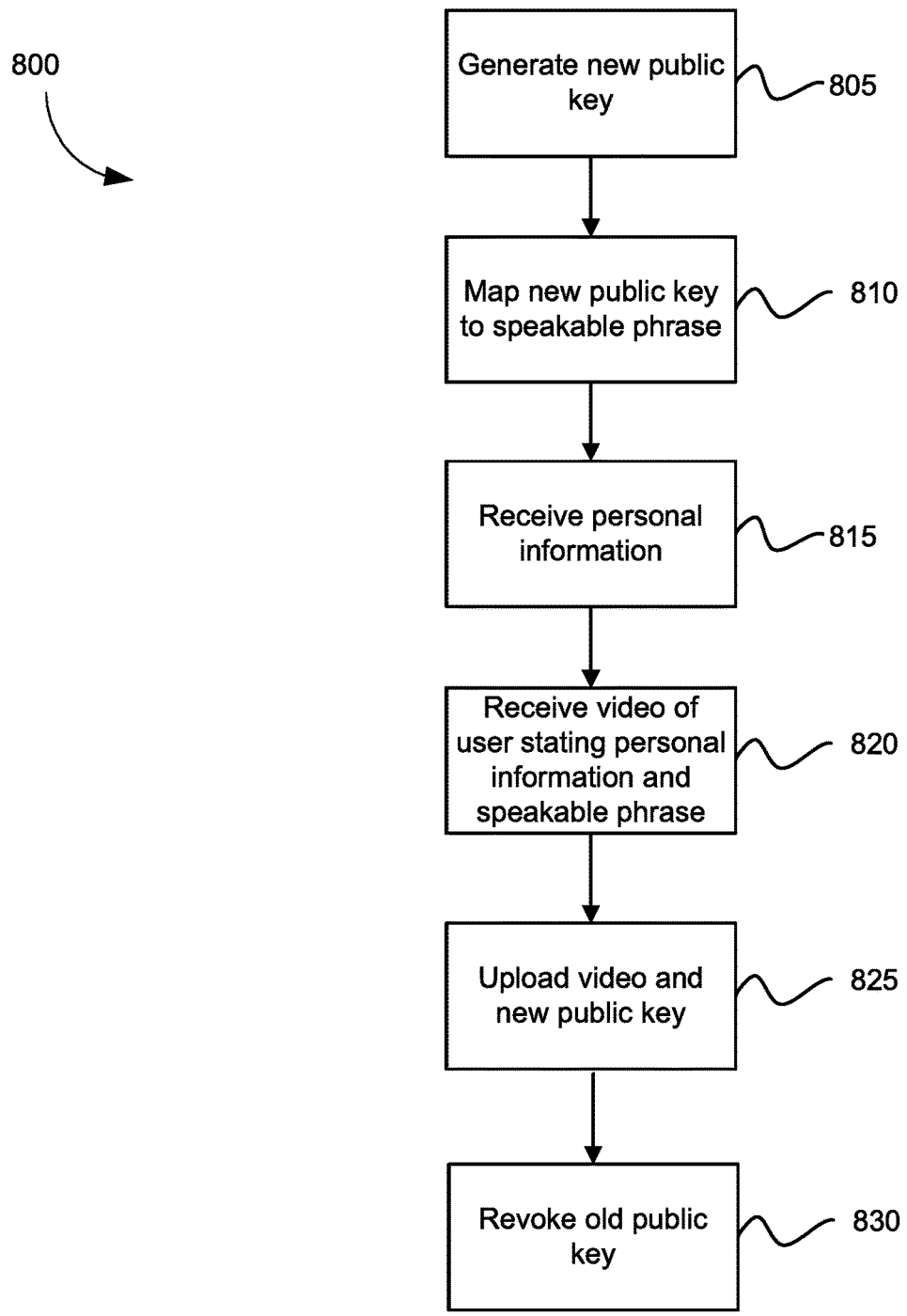
FIG. 8 is a flowchart of key revocation according to an example embodiment.

FIG. 8 is a flowchart of a method 800 for key revocation according to an example embodiment. According to some embodiments, the method 800 may be performed, for example, by a user device 1210. Many of the elements of the method 800 for key revocation may be similar to key initialization, for example, as described with reference to FIG. 3. Accordingly, a detailed description of these elements will not be repeated for compactness.

Referring to FIG. 8, the method 800 can include generating 805 a new public key (e.g., a public/private key pair). The method can include mapping 810 the new public key to a speakable phrase. For example, the user device 1210 may generate 805 the new public key and map 810 the new public key to a speakable phrase. The user device 1210 may receive 815 personal information of a user is received 815, and receive 820 a video of the user stating the personal information and the speakable phrase. The user device 1210 may upload 825 the video and public key to a server 1220, revoking 830 a previous public key. The previous public key may be revoked 830 either explicitly or inherently by virtue of uploading 825 a new public key and video. This is merely an example, and one of ordinary skill will recognize that the public key may be revoked using other or additional mechanisms. For example, in some cases, a revoking mechanism may utilize a two-step authentication process similar to that described above with reference to FIG. 4.

Figure 9:
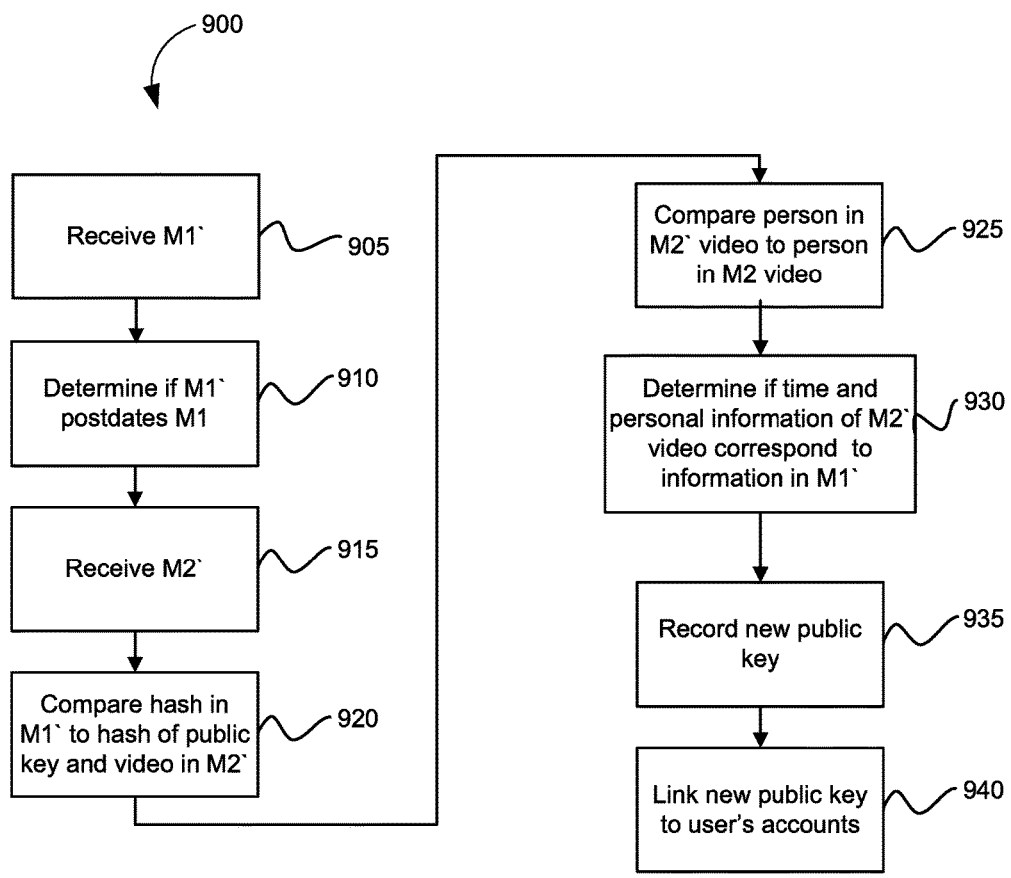
FIG. 9 is a flow chart of updating a user account according to an example embodiment.

In some circumstances, a server 1220 may update user log-in information to third party accounts (e.g., hosted by third-party devices 1230) when a new public key is provided. FIG. 9 is a flow chart of a method 900 of updating a user account according to an example embodiment. The method 900 may include receiving 905 (e.g., by the server 1220) a first new message (M1') in a same format as the first message M1. The server 1220 may analyze 910 the time of M1' to determine if it postdates M1 and refers to a contemporary time period.

The method 900 may further includes receiving 915 (e.g., by the server 1220) a second new message (M2') in a same format as the second message M2. The server 1220 may compare 920 a hash in M1' with a hash of the public key and video in M2'. The method 900 may include comparing 925 the identity of the person in the video of M2' to the person in the video of M2. In some cases, the server 1220 may compare 925 the person's identity automatically, for example, with voice and facial recognition software. The server 1220 may analyze 930 the video of M2' to determine if the person in the video of M2' is announcing the same time and personal information as that included in M1', and that the person in the video announces a same passphrase as the encoded version of the public key included in M1'. In some cases, the server may analyze 930 the video using of speech-to-text algorithms. Once M1' and M2' are verified, the server 1220 may record 935 a new public key, and link 940 the new public key to the user's accounts for future logins.

Example Key Monitoring

In some cases, key monitoring may be necessary to benefit from key revocation and recovery. In other words, it may be necessary to ensure that currently used keys are still valid. In some cases, a key announcement platform, e.g., a social network site on which a user announces his or her public key, may be monitored for new public keys. In some instances, it may be desirable to monitor the server records directly, for example, for added security.

Figure 10:
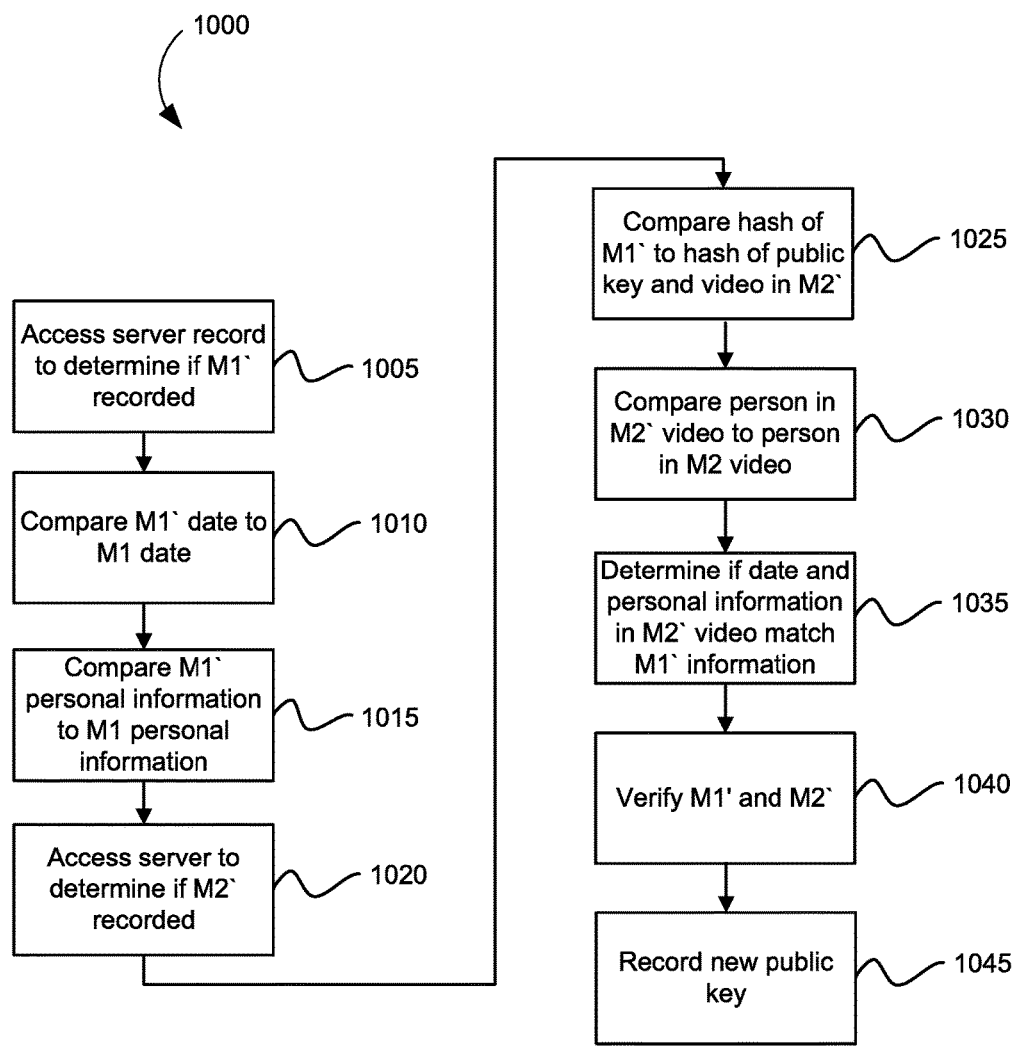
FIG. 10 is a flowchart of key monitoring according to an example embodiment.

FIG. 10 is a flowchart of a method 1000 for key monitoring according to an example embodiment. As a non-limiting example, the method 1000 may be performed by a third-party device 1230. Referring to FIG. 10, the method 1000 may include accessing 1005 (e.g., by the third-party device 1230) the server 1220 to determine if a first new message (M1') formatted like M1 has been recorded. The third-party device 1230 may compare 1010 the date of M1' to the date of M1, and compare 1015 the personal information of M1' to the personal information of M1.

The third-party device 1230 may access 1020 the server 1220 to determine if a second new message (M2') formatted like M2 has been recorded. The third-party device map compare 1025 a hash in M1' with a hash of the public key and video in M2', and compare 1030 the identity of the person in the video of M2' to the identified person in the video of M2. In some cases, the third-party device may compare the person's identity automatically, for example, through the use of voice and facial recognition software.

The third-party device 1230 may analyze 1035 the video of M2' to determine if the person is announcing the same time and personal information as the time and personal information included in M1'. In some cases, the third-party device 1035 may analyze 1035 the video of M2' using of speech-to-text algorithms. Once M1' and M2' are verified 1040 by the third-party device 1230, the third-party device 1230 may record 1045 a new public key from M2' and to be used instead of the public key announced by M1 and M2 in future communication with the user (e.g., the user device 1210).

In some embodiments, a Merkle tree-based construct as in can be used to improve ease of determining if the keys they use are still valid.

Example System Architecture

FIG. 11 is a block diagram of an illustrative computer system architecture 1100, according to an example implementation. For example, the computer system architecture 1100 may include a user device, a server, or a host configured to implement one or more techniques within the scope of the present disclosure. It will be understood that the computing device architecture 1100 is provided for example purposes only and does not limit the scope of the various implementations of the present disclosed systems, methods, and computer-readable mediums.

The computing device architecture 1100 of FIG. 11 includes a central processing unit (CPU) 1102, where computer instructions are processed, and a display interface 1104 that acts as a communication interface and provides functions for rendering video, graphics, images, and texts on the display. In certain example implementations of the disclosed technology, the display interface 1104 may be directly connected to a local display, such as a touch-screen display associated with a mobile computing device. In another example implementation, the display interface 1104 may be configured for providing data, images, and other information for an external/remote display 1150 that is not necessarily physically connected to the mobile computing device. For example, a desktop monitor may be used for mirroring graphics and other information that is presented on a mobile computing device. In certain example implementations, the display interface 1104 may wirelessly communicate, for example, via a Wi-Fi channel or other available network connection interface 1112 to the external/remote display 1150.

In an example implementation, the network connection interface 1112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 1104 may be operatively coupled to a local display, such as a touch-screen display associated with a mobile device. In another example, the display interface 1104 may be configured to provide video, graphics, images, text, other information, or any combination thereof for an external/remote display 1150 that is not necessarily connected to the mobile computing device. In one example, a desktop monitor may be used for mirroring or extending graphical information that may be presented on a mobile device. In another example, the display interface 1104 may wirelessly communicate, for example, via the network connection interface 1112 such as a Wi-Fi transceiver to the external/remote display 1150.

The computing device architecture 1100 may include a keyboard interface 1106 that provides a communication interface to a keyboard. In one example implementation, the computing device architecture 1100 may include a presence-sensitive display interface 1108 for connecting to a presence-sensitive display 1107. According to certain example implementations of the disclosed technology, the presence-sensitive display interface 1108 may provide a communication interface to various devices such as a pointing device, a touch screen, a depth camera, etc. which may or may not be associated with a display.

The computing device architecture 1100 may be configured to use an input device via one or more of input/output interfaces (for example, the keyboard interface 1106, the display interface 1104, the presence sensitive display interface 1108, network connection interface 1112, camera interface 1114, sound interface 1116, etc.) to allow a user to capture information into the computing device architecture 1100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1100 or may be a separate device. For example, the input device may be an accelerometer, a magnetometer, a digital camera, a microphone, and an optical sensor.

Example implementations of the computing device architecture 1100 may include an antenna interface 1110 that provides a communication interface to an antenna; a network connection interface 1112 that provides a communication interface to a network. As mentioned above, the display interface 1104 may be in communication with the network connection interface 1112, for example, to provide information for display on a remote display that is not directly connected or attached to the system. In certain implementations, a camera interface 1114 is provided that acts as a communication interface and provides functions for capturing digital images from a camera. In certain implementations, a sound interface 1116 is provided as a communication interface for converting sound into electrical signals using a microphone and for converting electrical signals into sound using a speaker. According to example implementations, a random access memory (RAM) 1118 is provided, where computer instructions and data may be stored in a volatile memory device for processing by the CPU 1102.

According to an example implementation, the computing device architecture 1100 includes a read-only memory (ROM) 1120 where invariant low-level system code or data for basic system functions such as basic input and output (I/O), startup, or reception of keystrokes from a keyboard are stored in a non-volatile memory device. According to an example implementation, the computing device architecture 1100 includes a storage medium 1122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1124, application programs 1126 (including, for example, a web browser application, a widget or gadget engine, and or other applications, as necessary) and data files 1128 are stored. According to an example implementation, the computing device architecture 1100 includes a power source 1130 that provides an appropriate alternating current (AC) or direct current (DC) to power components.

According to an example implementation, the computing device architecture 1100 includes a telephony subsystem 1132 that allows the device 1100 to transmit and receive sound over a telephone network. The constituent devices and the CPU 1102 communicate with each other over a bus 1134.

According to an example implementation, the CPU 1102 has appropriate structure to be a computer processor. In one arrangement, the CPU 1102 may include more than one processing unit. The RAM 1118 interfaces with the computer bus 1134 to provide quick RAM storage to the CPU 1102 during the execution of software programs such as the operating system application programs, and device drivers. More specifically, the CPU 1102 loads computer-executable process steps from the storage medium 1122 or other media into a field of the RAM 1118 in order to execute software programs. Data may be stored in the RAM 1118, where the data may be accessed by the computer CPU 1102 during execution.

The storage medium 1122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1122, which may include a machine-readable storage medium.

According to one example implementation, the term computing device, as used herein, may be a CPU, or conceptualized as a CPU (for example, the CPU 1102 of FIG. 11). In this example implementation, the computing device (CPU) may be coupled, connected, and/or in communication with one or more peripheral devices, such as display. In another example implementation, the term computing device, as used herein, may refer to a mobile computing device such as a smart phone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

According to some implementations, computer program code may be configured to control a computer device implement one or more methods within the scope of the present disclosure. For example, computer program code may control the computing device to generate or identify a public encryption key, encode the public encryption key as a speakable phrase, receive a video of a user reciting the speakable phrase, and transmit the public key and video to a server. In some cases, computer program code may be configured to control a computer device to send, to a server, a first message including personal information, a time, and a hash of a public key and a video, ensure the first message is correctly recorded, and send a second message including the video of a user and the public key to the server.

According to some embodiments, computer program code may be configured to control a server to receive a first message including personal information, a date, and a hash of a public key and a video, and second message including the video and the public key. The computer program code may control the server to determine if the hash in the first message matches a hash of the video and public key in the second message, and if the first message is a first message received for the corresponding date. The computer program code may control the server to determine whether the personal information in the first message corresponds to the person in the video of the second message, and compute an encoded hash of the public key to compare with a passphrase announced by the person in the video of the second message.

While certain implementations of the disclosed technology have been described throughout the present description and the figures in connection with what is presently considered to be the most practical and various implementations, it is to be understood that the disclosed technology is not to be limited to the disclosed implementations, but on the contrary, is intended to cover various modifications and equivalent arrangements included within the scope of the appended claims and their equivalents. Although specific terms are employed herein, they are used in a generic and descriptive sense only and not for purposes of limitation.

One of ordinary skill will understand that it is within the scope of the disclosure to have various modifications to the disclosed embodiments. Where methods have been described having certain elements, the order of elements may be altered unless a particular order is explicitly required.

In the foregoing description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementation," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms should be construed to take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a -given sequence, either temporally, spatially, in ranking, or in any other manner.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims and their equivalents, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   identifying, by a computer device, a message, the message comprising a public encryption key;
   encoding, by the computer device, the message;
   receiving, by the computer device, a video of a user reciting the encoded message; and providing, by the computer device, the message and the video for verification an authenticity of the message.

2. The method of claim 1, wherein the encoding comprises:
converting the message to a plurality of numerical values;
extracting, from at least one collection of sealable words, a plurality of speakable words corresponding to the plurality of numerical values; and
encoding the message as a multi-word phrase of the plurality of the extracted speakable words.

3. The method of claim 1, wherein the video comprises a video of the user reciting both the encoded message and personally identifying information of the user.

4. The method of claim 1, wherein the video comprises a video of the user reciting both the encoded message and a current time.

5. The method of claim 1, further comprising:
hashing, by the computer device, the public encryption key and the video;
uploading, by the computer device, the hash of the public encryption key and the video to a server; and
confirming, by the computer device, that the hash of the public encryption key and the video have been recorded on the server,
wherein the providing the message and the video comprises uploading, in response to confirming that the hash of the public encryption key and the video have been recorded on the server, the video and the public encryption key to the server.

6. The method of claim 1, wherein
the public encryption key comprises a new public encryption key,
the providing comprises uploading the video and the new public encryption key to a public-ledger, and
the method further comprises revoking a previous public encryption key associated with the user.

7. The method of claim 6, wherein the revoking comprises implicitly revoking the previous public encryption key by uploading the video and the new public encryption key.

8. The method of claim 6, further comprising:
hashing, by the computer device, the new public encryption key and the video;
uploading, by the computer device, the hash of the new public encryption key and the video to the public-ledger; and
confirming, by the computer device, that the hash of the new public encryption key and the video have been recorded on the public-ledger,
wherein the providing comprises uploading, in response to confirming that the hash of the new public encryption key and the video have been recorded on the public-ledger, uploading the video and the new public encryption key to the public-ledger.

9. The method of claim 1, wherein
the providing comprises uploading the video and the message to a server, and
the server operates as an append-only public ledger.

10. The method of claim 9, wherein the server further operates as a first-only public ledger.

11. A method comprising:
accessing, by a computer device, a public ledger to identify a first message and a second message, the first message including a first hash value, and the second message including a video and a public encryption key;
hashing, by the computer device, the video and the public encryption key from the second message to create a second hash value;
comparing, by the computer device, the first hash value and the second hash value; encoding, by the computer device, the public encryption key to a speakable phrase; determining that the video includes a speaker reciting the speakable phrase; and
verifying, by the computer device and in response to the comparing indicating that the first hash value equals the second hash value and the determining that the video includes the speaker reciting the speakable phrase, the public encryption key.

12. The method of claim 11, further comprising:
identifying, by the computer device, a time associated with the first message; and
determining, by the computer device, that the first message is an earliest message in the public ledger for the identified time associated with the first message,
wherein the verifying the public encryption key is further in response to the determining that the first message is the earliest message.

13. The method of claim 11, wherein
the first message further comprises personally identifying information,
the method further comprises determining that the personally identifying information corresponds to the speaker in the video, and
the verifying the public encryption key is further in response to the determining that the personally identifying information corresponds to the speaker in the video.

14. The method of claim 13, wherein the public ledger is a first-only public ledger.

15. A method comprising:
initiating, by a computer device, a telephone communication to an external device;
encoding, by the computer device and using a public encryption key, a shared secret shared with the external device, the encode shared secret comprising a plurality of numerical values;
converting the encoded shared secret to a series of dial-tones corresponding to the plurality of numerical values; and
transmitting, to the external device and using the telephone communication, the series of dial-tones.

16. The method of claim 15, wherein the public encryption key is verifiable by a video of a user of the computer device posted to an append-only public ledger.

17. The method of claim 16, further comprising:
sharing, by the computer device, the public encryption key with the external device; and
sharing, by the computer device, the shared secret with the external device.

18. A method comprising:
identifying, by a computer device, a message;
encoding, by the computer device, the message by:
converting the message to a plurality of numerical values,
extracting, from at least one collection of speakable words, a plurality of speakable words corresponding to the plurality of numerical values, and
encoding the message as a multi-word phrase of the plurality of the extracted speakable words;
receiving, by the computer device, a video of a user reciting the encoded message; and
providing, by the computer device, the message and the video for verification an authenticity of the message.

19. The method of claim 18, wherein the video comprises a video of the user reciting both the encoded message and at least one of personally identifying information of the user and a current time.

20. The method of claim 18, wherein
the providing comprises uploading the video and the message to a server, and
the server operates as a first-only public ledger.

* * * * *